(12) United States Patent
Tsybulnyk et al.

(10) Patent No.: US 11,748,150 B2
(45) Date of Patent: Sep. 5, 2023

(54) SYSTEM AND METHOD FOR BLOCKING PATH DETECTION

(71) Applicant: Microsoft Technology Licensing, LLC, Redmond, WA (US)

(72) Inventors: Vitalii Tsybulnyk, Redmond, WA (US); Arka Dasgupta, Bellevue, WA (US); Marwan Elias Jubran, Kirkland, WA (US); Clifford Thomas Dibble, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 500 days.

(21) Appl. No.: 16/411,202

(22) Filed: May 14, 2019

(65) Prior Publication Data

US 2020/0364081 A1 Nov. 19, 2020

(51) Int. Cl.
*G06F 9/46* (2006.01)
*G06F 9/48* (2006.01)

(52) U.S. Cl.
CPC .................. *G06F 9/4843* (2013.01)

(58) Field of Classification Search
CPC .................................................. G06F 9/4843
See application file for complete search history.

(56) References Cited

U.S. PATENT DOCUMENTS

| | | | | |
|---|---|---|---|---|
| 5,317,737 A * | 5/1994 | Barton | ................. | G06F 9/526 710/200 |
| 2005/0159969 A1* | 7/2005 | Sheppard | ............. | G06Q 10/00 705/7.36 |
| 2006/0288334 A1* | 12/2006 | Tian | ..................... | G06F 8/4441 717/127 |
| 2007/0233703 A1 | 10/2007 | Hebert et al. | | |
| 2007/0256058 A1* | 11/2007 | Marfatia | .................. | G06F 8/51 717/137 |

(Continued)

OTHER PUBLICATIONS

Donald P. Martin, "Capacity and Cycle Time—Throughput Understanding System (CAC-TUS) An Analysis Tool to Determine the Components of Capacity and Cycle Time in a Semiconductor Manufacturing Line", 1999.*

(Continued)

*Primary Examiner* — Camquy Truong
(74) *Attorney, Agent, or Firm* — Rainier Patents, P.S.

(57) ABSTRACT

A system and method for blocking path detection is provided. A job comprises tasks with at least some of the tasks dependent on other task(s). Each task is assigned to an ownership team. At a particular point in execution of the job, states of tasks of the job are identified. The states include one of three mutually exclusive states: waiting for another task/finished, in progress, and, blocked. When all the tasks with identified states of in progress or blocked are assigned to a particular ownership team, the particular ownership team is identified as on a blocking path. An action can be performed regarding the blocking path, for example, selected in accordance with policy-defined response actions such as generating an incident, escalating an existing incident, and/or sending a notification (e.g., an accumulated time on the blocking path can be calculated for each team with team(s) notified when certain threshold(s) are exceeded).

20 Claims, 8 Drawing Sheets

(56) References Cited

U.S. PATENT DOCUMENTS

| | | | |
|---|---|---|---|
| 2015/0124608 A1* | 5/2015 | Agarwal | H04L 47/122 370/235 |
| 2015/0154526 A1 | 6/2015 | Yates et al. | |
| 2016/0004577 A1 | 1/2016 | Geddes et al. | |
| 2016/0247104 A1* | 8/2016 | Rosenfeld | G06Q 10/0633 |
| 2017/0083369 A1 | 3/2017 | Jubran et al. | |
| 2017/0195183 A1 | 7/2017 | Gershaft et al. | |
| 2018/0150321 A1* | 5/2018 | Dunham | G06F 9/4881 |
| 2018/0157466 A1 | 6/2018 | Jubran et al. | |
| 2018/0159743 A1 | 6/2018 | Jubran et al. | |
| 2018/0341516 A1 | 11/2018 | Gupta et al. | |
| 2019/0089594 A1 | 3/2019 | Jubran et al. | |
| 2019/0332379 A1* | 10/2019 | Calhoun | G06F 12/126 |

OTHER PUBLICATIONS

"International Search Report and Written Opinion Issued in PCT Application No. PCT/US2020/027343", dated Jul. 28, 2020, 13 Pages.

* cited by examiner

SYSTEM AND METHOD FOR BLOCKING PATH DETECTION

BACKGROUND

Complex processes involving many tasks some of which may be dependent on other task(s) can be difficult to accurately model a priori. For example, processing performed by particular tasks may frequently change and/or dependencies of particular tasks may change.

SUMMARY

Described herein is a system for blocking path detection, comprising: a computer comprising a processor and a memory having computer-executable instructions stored thereupon which, when executed by the processor, cause the computer to: receive information regarding a job to be executed, the job comprising a plurality of tasks, at least some of the tasks dependent on at least one other task, wherein each task is assigned to an ownership team of a plurality of ownership teams; at a particular point in execution of the job, identify states of tasks of the job, the states comprising one of: waiting for another task/finished, in progress, and, blocked; when all the tasks with identified states of in progress or blocked are assigned to a particular ownership team (e.g., all task(s) of all other ownership team(s) are finished or waiting), identify the particular ownership team as on a blocking path; and, provide a notification regarding the blocking path.

Also described herein is a method of blocking path detection, comprising: receiving information regarding execution of a job to be executed, the job comprising a plurality of tasks, at least some of the tasks dependent on at least one other task, wherein each task is assigned to an ownership team of a plurality of ownership teams, each ownership team assigned a maximum period of time to be on a blocking path of execution of the job; for at least some of the ownership teams, tracking a period of time the particular ownership team has been on the blocking path; after commencement of execution of the job, at particular points in execution of the job: identifying states of tasks of the job, the states comprising one of: waiting for another task/finished, in progress, and, blocked; when all the tasks with identified states of in progress or blocked are assigned to a particular ownership team, identifying the particular ownership team as on the blocking path; increasing the period of time the particular ownership team has been on the blocking path; and when the period of time the particular ownership team has been on the blocking path exceeds a threshold amount, performing an action regarding the blocking path.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to blocking path detection are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding block path detection. What follows are one or more exemplary systems and methods.

Aspects of the subject disclosure pertain to the technical problem of detecting task(s) and/or sub-task(s) that are impeding progress of an executing job. The technical features associated with addressing this problem involve receive information regarding a job to be executed, the job comprising a plurality of tasks, at least some of the tasks dependent on at least one other task, wherein each task is assigned to an ownership team of a plurality of ownership teams; at a particular point in execution of the job, identify states of tasks of the job, the states comprising one of: waiting for another task/finished, in progress, and, blocked; when all the tasks with identified states of in progress or blocked are assigned to a particular ownership team (e.g., all task(s) of all other ownership team(s) are finished or waiting), identify the particular ownership team as on a blocking path; and, perform an action regarding the blocking path. For example, the blocking path can indicate that all in progress or blocked task(s) are assigned to one particular ownership team with all task(s) of all other ownership team(s) have finished or are waiting. Accordingly, aspects of these technical features exhibit technical effects of more efficiently and effectively executing jobs, for example, reducing consumption of computing resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Conventionally, job(s) and process(es) can be automated workflows (tasks). Typical workflows can be complex composites of many sub-workflows (sub-jobs) and individual activities (tasks) that are owned by various teams (owning teams), some of which run in parallel to each other, and can have a significant number of mutual dependencies.

Such complexity introduces several challenges. First it is often not straightforward to identify what sub-job and task blocks and/or slows down the overall progress of a given job. Next, division of cycle time goals for each owning team is not readily determinable. Finally, the sub jobs are owned and defined by many different teams. The internal task-level structure of these sub-jobs can change as teams refactor the code. The topology of dependencies between the tasks can also evolve and change, even during execution of a job. When viewed as an execution graph, the topology of the execution graph can change and evolve independent of an execution environment.

Thus, taken together, the overall process can be fine-grained, stochastic, and/or subject to evolution of the execution graph over time. Accordingly, in some embodiments, critical path analysis and/or PERT chart analysis are not feasible since the current execution graph (and dependencies therein) may not be known a priori and/or may change during execution of the job.

Described herein is a system and method of performing blocking path analysis independent independence of complex topologies in the execution graph. Instead of traversing a complex graph (which can be very time-consuming or even impossible in case of cyclic or broken graphs) the blocking path technique described here scans current task states and subsequently reasons over a set of defined states: (1) waiting for another task or processing of the particular task has been completed; (2) task is in progress; or (3) task is blocked. When all the tasks with identified states of in progress or blocked are assigned to a particular ownership team with all task(s) of all other ownership team(s) have finished or are waiting, the particular ownership team is identified as on a blocking path.

Figure 1:
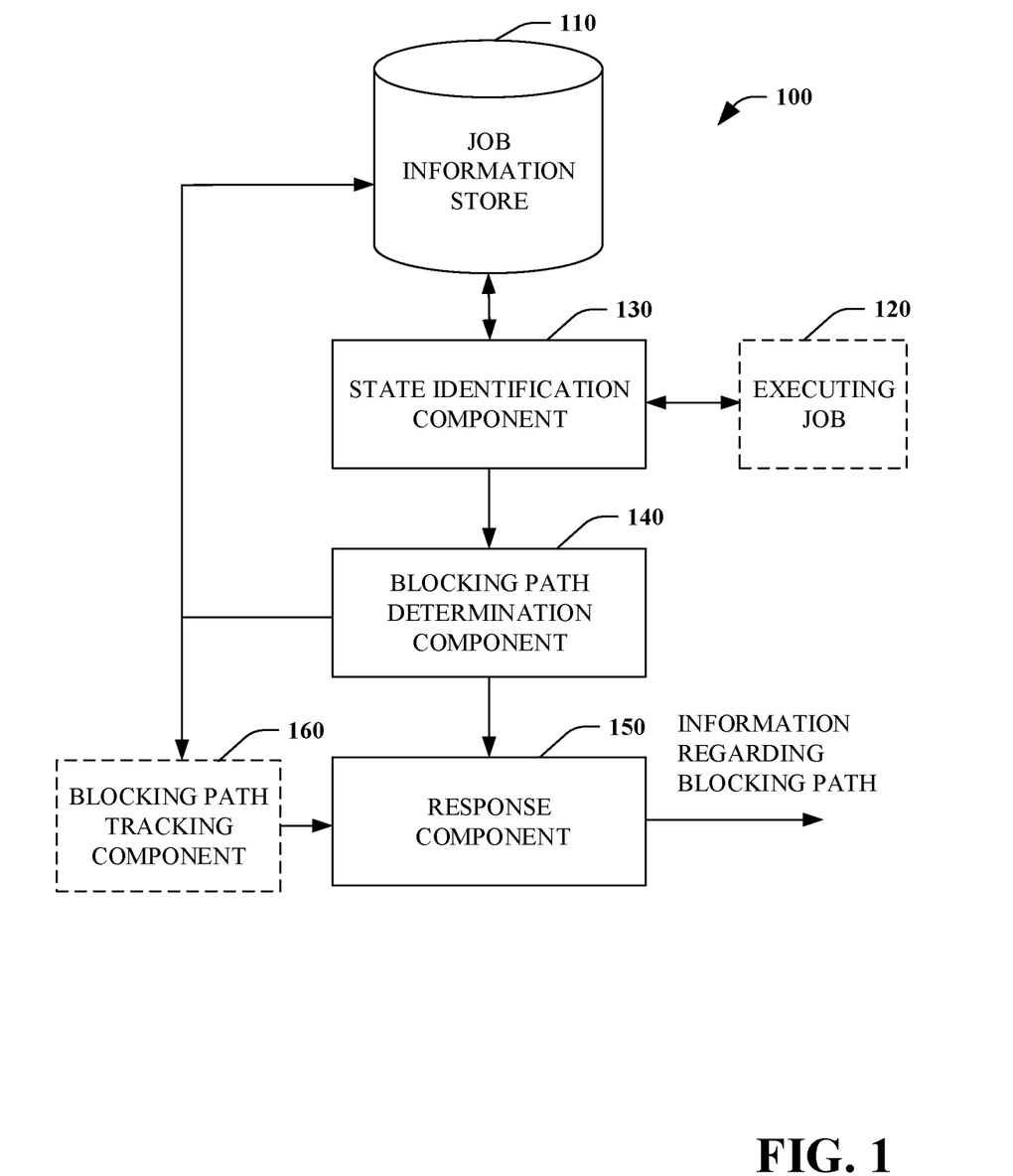
FIG. 1 is a functional block diagram that illustrates a system for blocking path detection.

Referring to FIG. 1, a system for blocking path detection 100 is illustrated. The system 100 can be utilized to determine a blocking path for a monitored complex process (job) involving a plurality of tasks some of which are dependent on other task(s) in order to begin and/or complete processing. In some embodiments, the system 100 can avoid complexities associated with conventional analysis techniques such as critical path analysis and/or PERT chart analysis since the system 100 is adaptable to the evolving execution topology, and is robust in the face of the stochastic nature of the workflows (tasks/sub-tasks of jobs).

For purposes of explanation and not limitation, the system and method are described in the context of a cluster buildout process for computer data center(s); however, the system and method for blocking path detection can be utilized to determine blocking path(s) for other complex processes involving many tasks some of which are dependent on other task(s). For example, the system and method can be utilized to detect blocking path(s) in process(es) for software development, manufacturing, and the like.

Frequently, a buildout process for computer data center capacity can have a long cycle time and high variance, which can cause capacity shortages which can impact customer satisfaction. For example, long-tailed distributions can be observed that stem from an excessive number of incidents that are left unattended delaying completion for significant period of time (e.g., hours, days). This can create variance which can difficult for an associated organization to accurately perform long-range planning.

As used in herein, a "job" refers to an overall process comprised of a plurality of tasks on behalf of a plurality of owners. Each task can include zero, one, or more subtasks. An owner (e.g., ownership team) is assigned responsibility for each task. A task can be automated process (e.g., configuration of a module of software), semi-automated process (e.g., configuration of a module of software with human input), and/or manual process (e.g., receive human input, physically install a piece of hardware).

The system 100 includes a job information store 110 that stores information regarding an executing job 120. The information can include about tasks of a particular job, dependencies among the tasks, and, a monitored past and/or current state of each task. As discussed in greater detail below, for purposes of explanation and not limitation, a job can be represented as an execution graph comprised of a plurality of nodes with each node representing a particular task. At least some of the nodes can dependent upon processing of one or more other nodes. In some embodiments, a dependency can be based upon a particular node that can only be performed after completion of processing of another node. In some embodiments, a dependency can be based upon a particular node that can only be performed after receiving information from another node (e.g., during processing of the another node and/or upon completion of processing of the another node).

In some embodiments, each cluster buildout workflow comprises a job tree with a single root job and zero, one or more subjobs. Each job (root or sub) contains one or more tasks. Jobs can be executed in parallel with respect to one another. Tasks inside a given job can execute in parallel with respect to one another. Additionally, dependency(ies) can exist between a task in one job and a different task in a different job.

In some embodiments, the monitored current state information for tasks stored in the job information store 110 is updated periodically (e.g., every minute, every fifteen minutes, every hour, every day) by a state identification component 120. In some embodiments, the current state information for a particular task comprises one of three mutually exclusives states:

(1) The particular task waiting for another task or processing of the particular task has been completed;
(2) The particular task in progress; or
(3) The particular task is blocked.

"Blocked" refers to the particular task being unable to continued processing. In some embodiments, the particular task can be blocked because it is in a wait state (e.g., waiting for human input). In some embodiments, the particular task can be blocked because an exception has been generated (e.g., software fault or bug).

In some embodiments, using the information stored in the job information store 110, a blocking path determination component 130 can scan the entire job tree (graph), from the root job to all sub-jobs and the tasks spawned by them, to identify if at any point the progress of the entire job tree is dependent on a single owning team's task(s). If so, the owning team's task set and/or the owning team is then designated to be on the blocking path of the process achieving goal state (e.g., completion of the job). This does not mean that all or even any task in that taskset is necessarily in a blocked state, although they often are. Thus, in some embodiments, the blocking path determination is indicative that the remaining task(s) of the executing job 120 (e.g., unexecuted task(s)) are waiting (e.g., directly and/or indirectly) on task(s) only of that particular owning team.

In some embodiments, the executing job 120 can be one of a plurality of executing jobs managed by a service (platform). The blocking path calculation can occur in-memory as part of each root job (e.g., executing job 13) in the platform. Each platform root job can have an additional thread (e.g., system 100) that runs parallel to the main workflow execution thread and periodically calculates the blocking path information for the particular executing job 120 (e.g., every 15 minutes). First, the scanning thread (e.g., system 100) enumerates the jobs/sub-jobs in a root job tree, down to the lowest level. Then it enumerates the tasks in those jobs/sub-jobs and group them by their owning teams and filters out the tasks that are used to create sub-jobs. Each owning team is then individually evaluated to determine if it owns a task that is a blocking path candidate. A task is considered a blocking path candidate if it is in progress or blocked by an incident. Any owning team that has one or more blocking tasks is considered a candidate for the blocking team. Finally, the thread rolls up this information to the root job level, and if and only if there is a single candidate blocking team, the blocking path is determined to exist for the root job and that owning team is identified as the blocking team.

For purposes of explanation and not limitation, several simplified executing jobs 120 will be discussed. Table 1 illustrates a simple job without sub-jobs:

TABLE 1

Root Job
    Task 1 / Team 1 (finished)
    Task 2 / Team 1 (blocked) – (blocking path task)
    Task 3 / Team 1 (finished)
    Task 4 / Team 1 (in progress) – (blocking path task)

With respect to the job of Table 1, the blocking path determination component 140 has identified "Task 2" and "Task 4" as candidate blocking path tasks. "Task 2" is a candidate because the task is blocked, and, "task 4" is a candidate because the task is in progress. Since the two candidate blocking tasks are owned by the same team ("Team 1"), the blocking path determination 140 can identify "Task 2" and "Task 4" as on the blocking path owned by "Team 1".

Next, Table 2 illustrates another simple job without sub-jobs:

TABLE 2

Root Job
    Task 1 / Team 1 (finished)
    Task 2 / Team 1 (blocked)
    Task 3 / Team 2 (finished) notification
    Task 4 / Team 2 (in progress)

Referring to Table 2, the blocking path determination component 140 has identified "Task 2" and "Task 4" as candidate blocking path tasks. However, since the two candidate block path tasks are owned by different teams, the blocking path determination component 140 does not identify a blocking path.

Table 3 illustrates a simple job with one sub-job:

TABLE 3

Root Job
    Task 1 (finished)
    Task 2 (ignore) – Sub-job 1
        Task 1 (finished)
        Task 2 (finished)
        Task 3 / Team 1 (in progress)
    Task 3 (finished)
    Task 4 / Team 1 (in progress)

With respect to Table 3, the blocking path determination component 140 identifies "Task 3 of sub-job 1 of Task 2" and "Task 4" as candidate blocking path tasks. Because these two candidate blocking tasks are owned by the same team ("Team 1"), the blocking path determination 140 can identify "Task 3 of sub job 1 of Task 2" and "Task 4" as on the blocking path owned by "Team 1".

Table 4 also illustrates a simple job with one sub-job:

TABLE 4

Root Job
    Task 1 (finished)
    Task 2 (ignore) – Sub-job 1
        Task 1 (finished)
        Task 2 (finished)
        Task 3 / Team 2 (in progress)
    Task 3 (finished)
    Task 4 / Team 1 (in progress)

With respect to Table 4, the blocking path determination component 140 identifies "Task 3 of sub-job 1 of Task 2" and "Task 4" as candidate blocking path tasks. However, the since the two candidate block path tasks are owned by different teams, the blocking path determination component 140 does not identify a blocking path.

Finally, Table 5 illustrates a complex job tree:

TABLE 5

Root Job
    Task 1 (finished)
    Task 2 (finished)
    Task 3 (finished)
    Task 4 (ignore) – Sub-job 1
        Task 1 (finished)
        Task 2 / Team 1 (in progress)
        Task 3 (not started)
    Task 5 (ignore) – Sub-job 2
        Task 1 (finished)
        Task 2 / Team 1 (blocked)
        Task 3 (not started)
    Task 6 (ignore) – Sub-job 3
        Task 1 (finished)
        Task 2 (finished)
        Task 3 (finished)
        Task 4 (ignore) – Sub-job 5
            Task 1 (finished)
            Task 2 / Team 1 (blocked)
    Task 7 (not started)
    Task 8 (not started)

With respect to Table 5, the blocking path determination component 140 identifies "Task 2 of sub-job 1 of Task 4", "Task 2 of sub-job 2 of Task 5", and "Task 2 of sub-job 5 of sub-job 3 of Task 6" as candidate blocking path tasks.

Because these three candidate blocking tasks are owned by the same team ("Team 1"), the blocking path determination 140 can identify "Task 2 of sub-job 1 of Task 4", "Task 2 of sub-job 2 of Task 5", and "Task 2 of sub-job 5 of sub-job 3 of Task 6" as on the blocking path owned by "Team 1".

The blocking path determination component 140 can provide information regarding the identified blocking path (e.g., task(s)/sub-task(s) involved, owning team) to a response component 150. In some embodiments, based, at least in part, upon the provided information, the response component 150 can provide a notification to the owning team. In some embodiments, the notification can include a notification on a user interface of the service of the platform, an email, an SMS text message, an instant message, a voicemail to a telephone number, and the like. In some embodiments, the action performed is based upon a length of time that the identified particular owning team has been on the blocking path for this instance (e.g., these particular identified task(s)/sub-task(s)). In some embodiments, the action performed is based upon a length of time that the identified particular owning team has been on the blocking path over the execution of the executing job 120 (e.g., per job execution).

In some embodiments, the action performed is based upon a policy that sets forth various actions, for example, generate incident, escalate incident, notify, etc. selected based upon the particular owning team, the particular task(s)/sub-task(s) involved, the length of time that the identified particular owning team has been on the block path for this instance, and/or, the length of time that the identified particular owning team has been on the blocking path over the execution of the executing job 120. In some embodiments, the action performed is based upon a hierarchical ordering of action, the action selected based upon the particular owning team, the particular task(s)/sub-task(s) involved, the length of time that the identified particular owning team has been on the block path for this instance, and/or, the length of time that the identified particular owning team has been on the blocking path over the execution of the executing job 120. For example, when a particular task of a particular owning team is identified as being on the blocking path (e.g., highly significant software update), a particular individual (e.g., program manager) can receive a notification via one or more specified communication/notification modalities. For example, the particular individual can initially receive an email notification. If the condition persists for a threshold period of time, a manager of the particular individual can receive an email notification in order to escalate significance of the continued blocking path determination.

In some embodiments, the system 100 can be utilized to identify ownership team(s) having task(s)/sub-task(s) that individually and/or collectively exceed reasonable time constraints. For example, in some instances, incident(s) associated with blocked task(s) can be left unattended for extended periods of time (e.g., minutes, hours, days).

Optionally, the system 100 can further include a blocking path tracking component 160 that tracks length(s) of time that one, some, or all of a plurality of ownership teams have been identified as on the blocking path of one or more particular executing jobs 120. In some embodiments, this tracked information can be utilized during and/or after completion of the executing job 120 to determine performance metric(s), process change(s) for future and/or current job(s), and/or resource allocation for current and/or future job(s). In some embodiments, a period of time on the blocking path for one, some, or all of the plurality of ownership teams is pre-defined (e.g., based upon historical information and/or target information for the job).

In some embodiments, each owning team is assigned a specific expected duration (e.g., goal) for a particular job setting forth a period of time that each is allowed to be on the blocking path of the particular job. In some embodiments, this expected duration is derived from the end-to-end cycle time for the particular job using ratios that are defined from historical data computed over a particular period of time (e.g., the last several months of execution telemetry) using following method.

First, a sample set of historical jobs of a given kind is taken with outliers removed e.g. by choosing 75% of them in terms of best execution duration). Next, a determination is made as to a quantity of time each owning team spent on the blocking path. A statistical mean of these two metrics (historical job execution time, and, time on blocking path for each owning team) can be obtained. Thereafter, a ratio of those means can be utilized to determine what percentage of time job(s) of a given owning team spends on the blocking path, on average:

Blocking path ratio=Mean time on blocking path of all owning teams/Mean job execution time The combined blocking path for all owning teams is a target job execution time adjusted by the blocking path ratio.

Next, a blocking path duration of each owning team for each job in the sample set can be calculated with outliers removed (e.g. take 75% shortest durations per team). Each owning team can be assigned a portion of the combined blocking path time that the historical team's historical share on the blocking path in the job execution time.

In this manner, a task's wait on its dependency does not count against the owning team. Task(s) making progress in parallel to other tasks do not count against the blocking path time of the owning team, as long as these task(s) are not on a blocking path for the overall main job. Accordingly, in some embodiments, teams are encouraged to their work as early as possible and make progress in parallel to others (even if such progress is slower than if given owning team was the only one making progress) in order to reduce end-to-end execution time.

In some embodiments, when the system 100 does not identify a blocking path, other technique(s) can be used in addition to the blocking path technique (discussed above) to identify tasks/teams that introduce higher risks of blocking progress, e.g. identify escalation tickets linked to "in progress" tasks, or apply "blocking path" determination to multiple teams at the same time.

Figure 2:
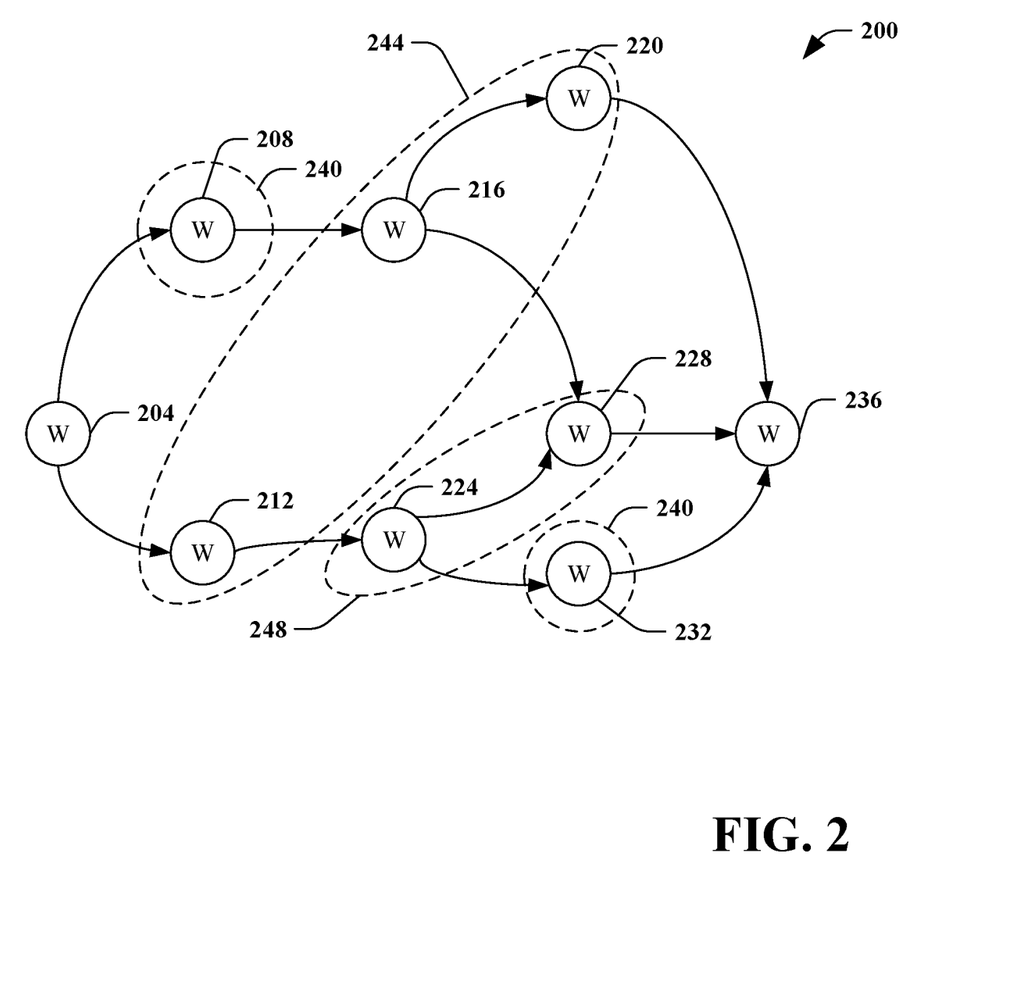
FIG. 2 is an exemplary execution graph.
Figure 3:
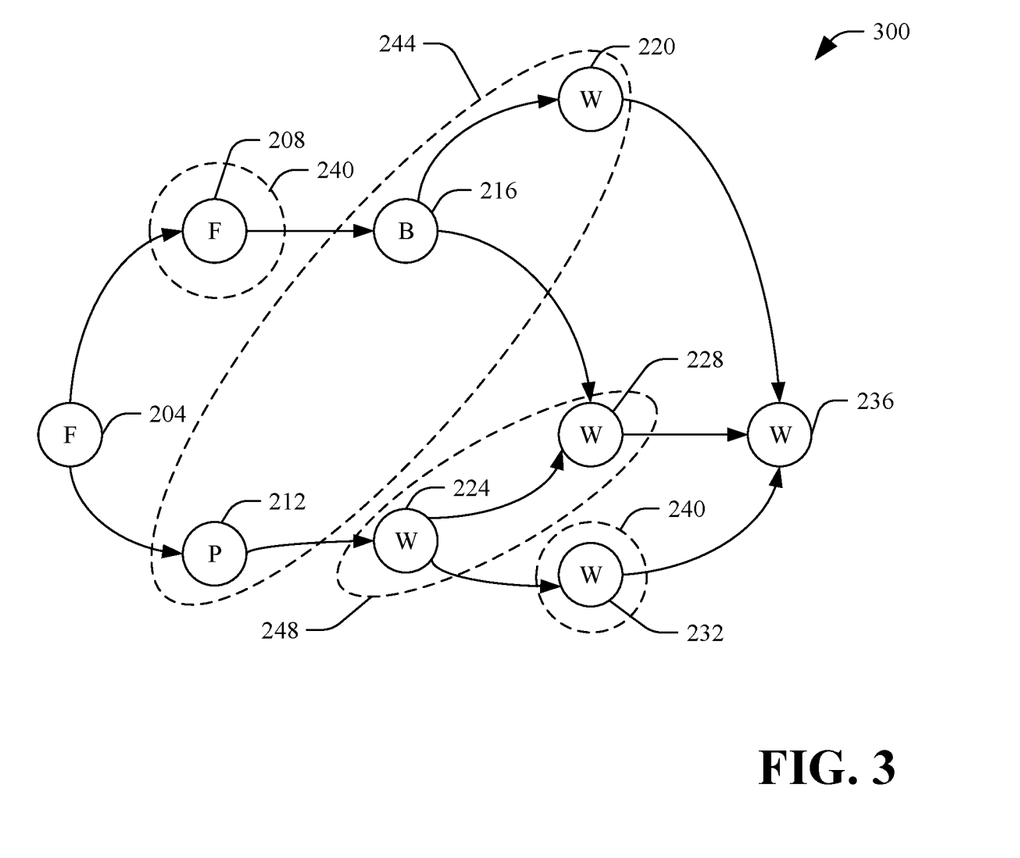
FIG. 3 is another exemplary execution graph.
Figure 4:
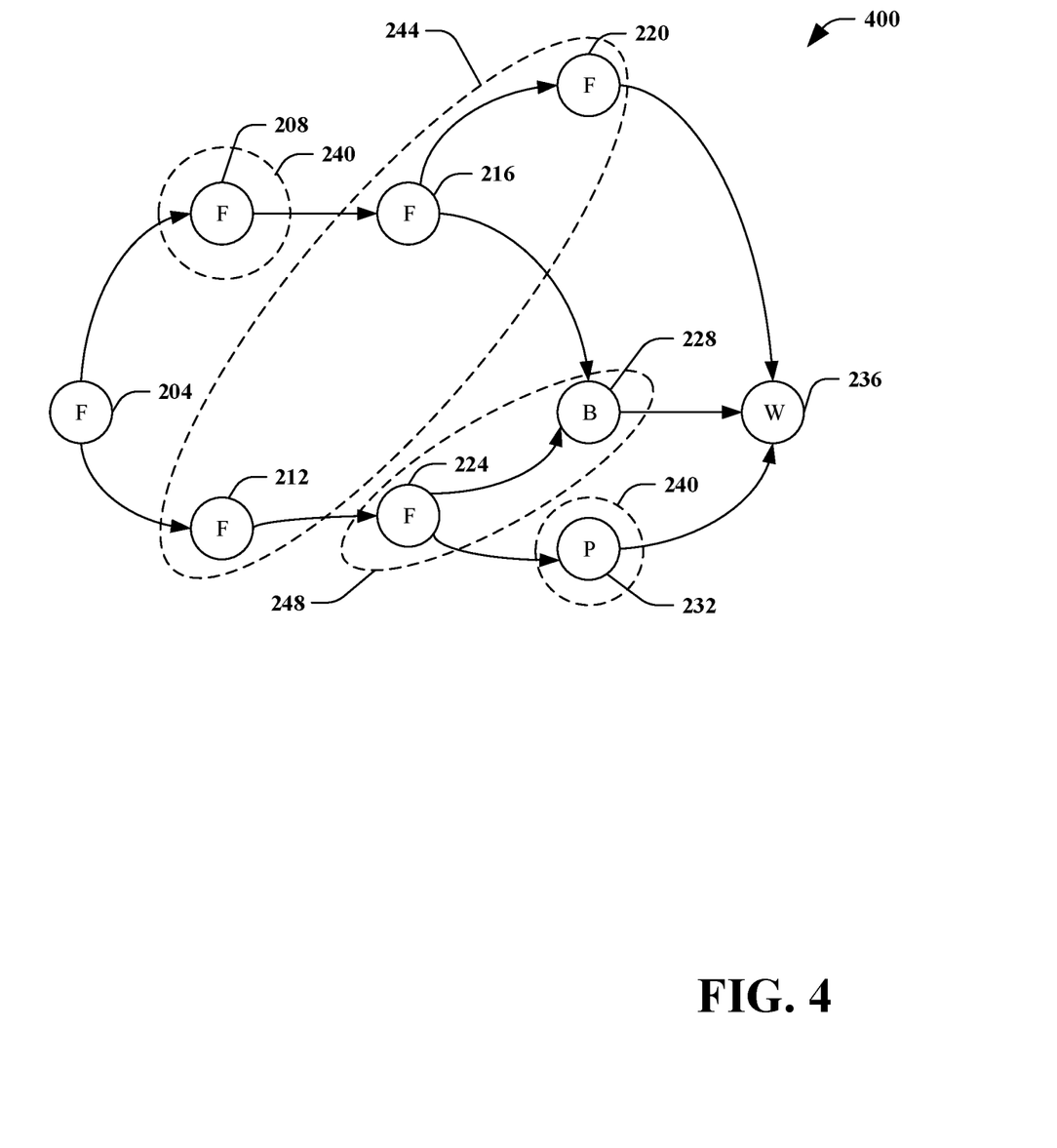
FIG. 4 is yet another exemplary execution graph.

Referring to FIGS. 2-4, exemplary execution graphs 200, 300, 400 at various times of execution of a particular job are illustrated. For purposes of explanation and not limitation, the graphs 200, 300, 400 include a start task 204, seven action tasks 208, 212, 216, 220, 224, 228, 232, and, an end task 236 (goal task). Also for purposes of explanation and not limitation, the action tasks are assigned to three ownership teams $Team_1$ 240, $Team_2$ 244, $Team_3$ 248. A task waiting for another task is marked with a "W", a task that has finished is marked with an "F", a task that is in progress is marked with a "P", and, a task that is blocked is marked with a "B".

Turning to FIG. 2, an exemplary execution graph 200 is illustrated prior to execution. Initially, the current state of the seven action tasks 208, 212, 216, 220, 224, 228, 232 are "waiting for another task" as they are all directly or indirectly dependent upon the start task 204.

Referring next to FIG. 3, job execution has begun with the start task 204, and, task 208 completed. Task 212 is progressing, and, task 216 is blocked. The remaining tasks 220, 224, 228, 232, and the end task 236 are "waiting for another task". Task 212 (progressing) and task 216 (blocked) are blocking path candidates. Since task 212 and task 216 are both assigned to Team$_2$ 244 and there are no block path candidates assigned to other ownership teams, Team$_2$ 244 is identified by the system 100 as the blocking team.

FIG. 4 illustrates subsequent job execution with the start task 204, and tasks 208, 212, 216, 220, 224 completed. Task 228 is blocked and task 232 is progressing. Task 228 (blocked) and task 232 (progressing) are blocking path candidates. However, since task 228 and task 232 are assigned to different ownership teams, Team$_2$ 244 and Team$_3$ 248, respectively, the system 100 does not identify a block team at this point in time.

Figure 5:
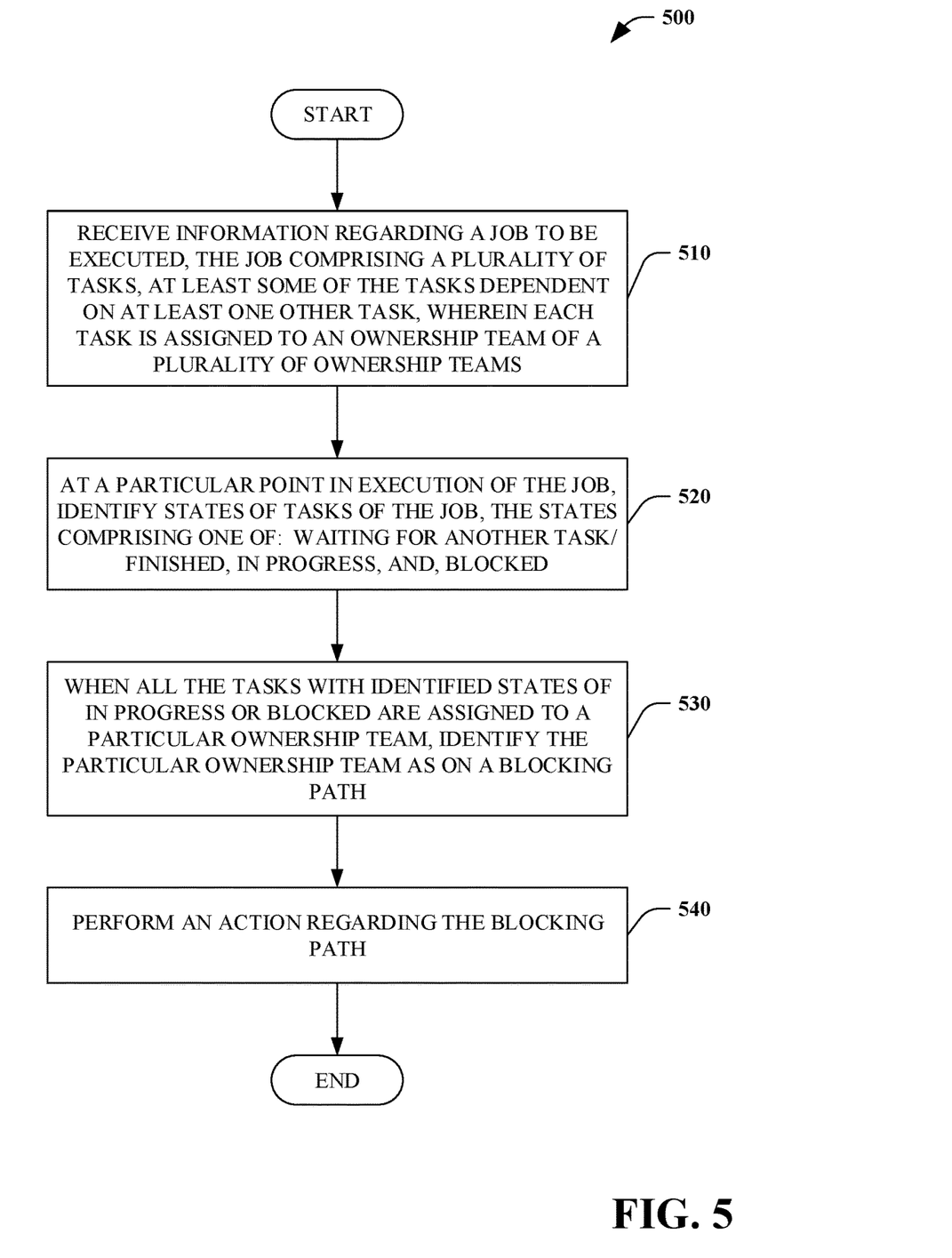
FIG. 5 illustrates an exemplary methodology of a method of blocking path detection.
Figure 6:
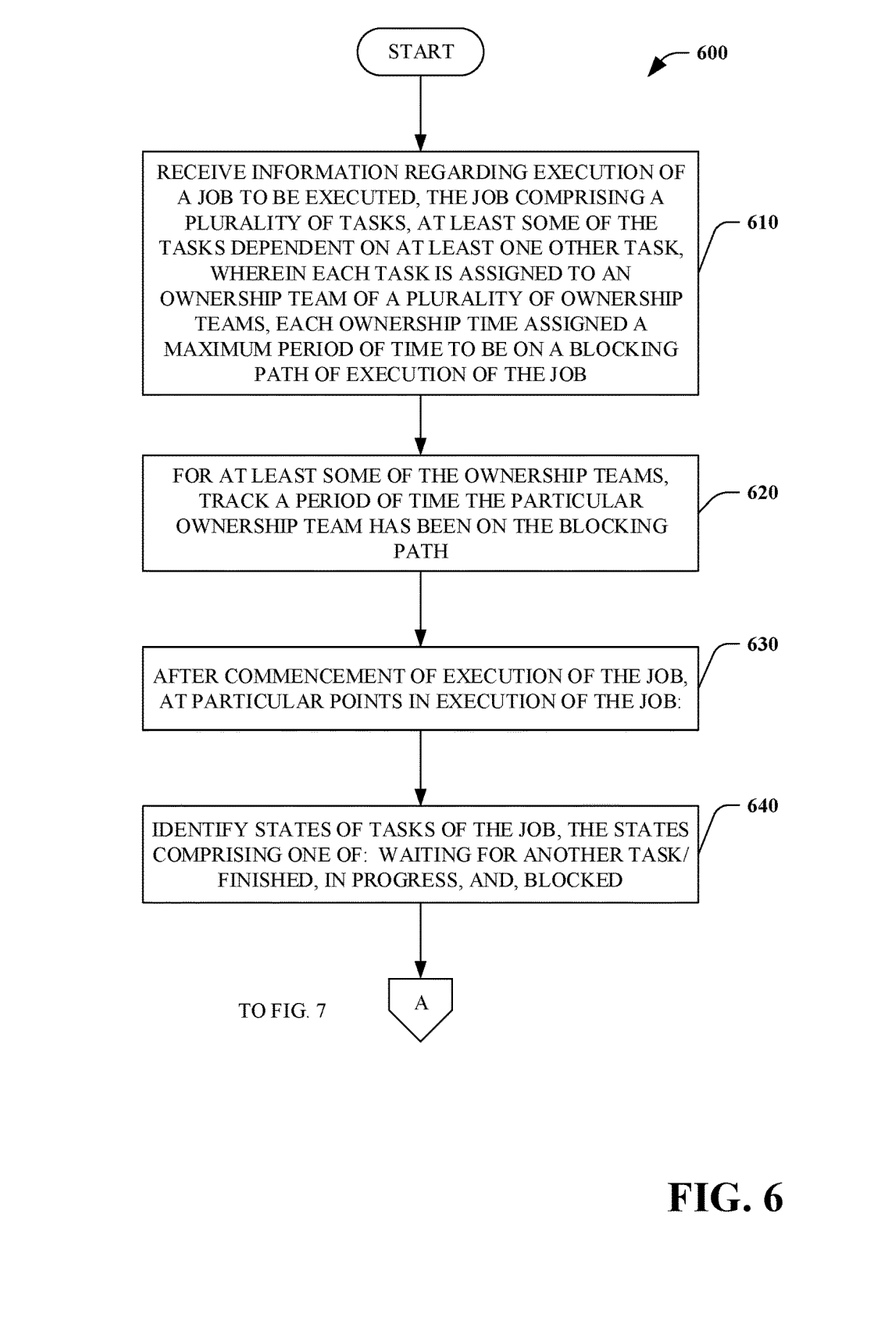
FIGS. 6 and 7 is a flow chart that illustrates a method of blocking path detection.
Figure 7:
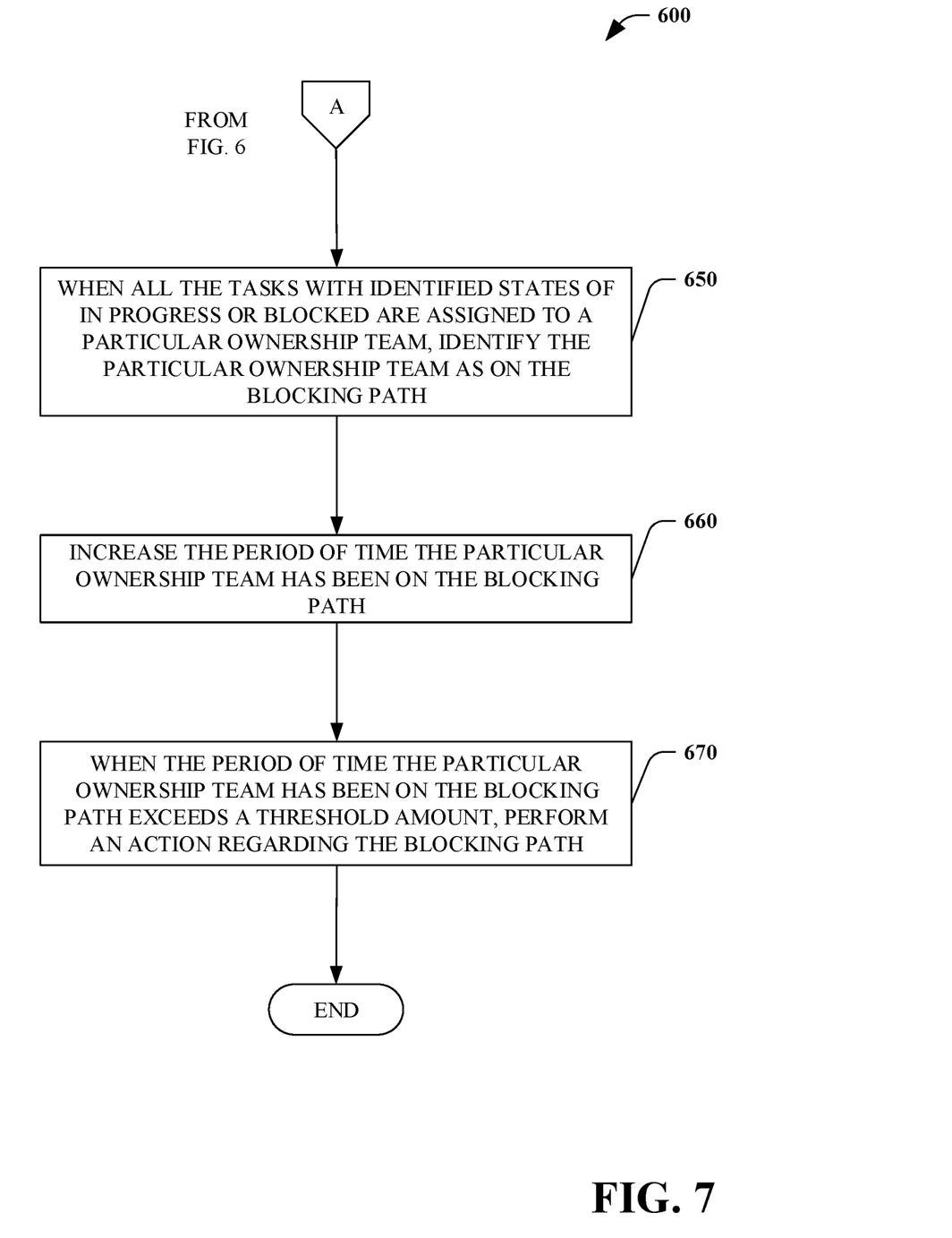

FIGS. 5-7 illustrate exemplary methodologies relating to blocking path detection. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 5, a method of blocking path detection 500 is illustrated. In some embodiments, the method 500 is performed by the system 100.

At 510, information regarding a job to be executed is received. The job comprises a plurality of tasks, at least some of the tasks dependent on at least one other task. Each task is assigned to an ownership team of a plurality of ownership teams.

At 520, at a particular point in execution of the job, states of tasks of the job are identified. The states comprise one of: waiting for another task/finished, in progress, and, blocked.

At 530, when all the tasks with identified states of in progress or blocked are assigned to a particular ownership team, the particular ownership team is identified as on a blocking path. At 540, an action is performed regarding the blocking path (e.g., particular ownership team and/or tasks with identified states of in process or blocked).

Turning to FIGS. 6 and 7, a method of blocking path detection 500 is illustrated. In some embodiments, the method 600 is performed by the system 100.

At 610, information regarding execution of a job to be executed is received. The job comprises a plurality of tasks, at least some of the tasks dependent on at least one other task. Each task is assigned to an ownership team of a plurality of ownership teams, each ownership time assigned a maximum period of time to be on a blocking path of execution of the job.

At 620, for at least some of the ownership teams, a period of time the particular ownership team has been on the blocking path is tracked. At 630, after commencement of execution of the job, at particular points in execution of the job, the acts of 640, 650, 660, and/or 670 are performed.

At 640, states of tasks of the job are identified. The states comprise one of: waiting for another task/finished, in progress, and, blocked. In some embodiments, the states of tasks are one of these three mutually exclusive states.

At 650, when all the tasks with identified states of in progress or blocked are assigned to a particular ownership team, the particular ownership team is identified as on the blocking path. At 660, the period of time the particular ownership team has been on the blocking path is increased. At 670, when the period of time the particular ownership team has been on the blocking path exceeds a threshold amount, an action is performed regarding the blocking path is provided.

Described herein is a system for blocking path detection, comprising: a computer comprising a processor and a memory having computer-executable instructions stored thereupon which, when executed by the processor, cause the computer to: receive information regarding a job to be executed, the job comprising a plurality of tasks, at least some of the tasks dependent on at least one other task, wherein each task is assigned to an ownership team of a plurality of ownership teams; at a particular point in execution of the job, identify states of tasks of the job, the states comprising one of: waiting for another task/finished, in progress, and, blocked; when all the tasks with identified states of in progress or blocked are assigned to a particular ownership team, identify the particular ownership team as on a blocking path; and perform an action regarding the blocking path.

The system can include wherein the action comprises providing a notification to the particular ownership team. The system can further include wherein the action performed comprises at least one of creating an incident, or escalating severity of an existing incident. The system can include wherein the information regarding the job to be executed changes during execution of the job.

The system can further include wherein the computer-executable instructions are performed periodically during execution of the job. The memory can store further computer-executable instructions which, when executed by the processor, cause the computer to: for at least one of the ownership teams, track a period of time the ownership team has been on the blocking path. The memory can store further computer-executable instructions which, when executed by the processor, cause the computer to: for each ownership team, track a period of time the ownership team has been on the blocking path.

The system can further include wherein the notification provided is based upon a hierarchical ordering of notifications, the notification selected based upon at least one of the particular identified ownership team, a particular identified task as in progress or blocked, a length of time that the identified particular owning team has been on the block path, or, a length of time that the identified particular owning team has been on the blocking path over the execution of the job.

Described herein is a method of blocking path detection, comprising: receiving information regarding execution of a job to be executed, the job comprising a plurality of tasks, at least some of the tasks dependent on at least one other task, wherein each task is assigned to an ownership team of a plurality of ownership teams, each ownership team assigned a maximum period of time to be on a blocking path of execution of the job; for at least some of the ownership teams, tracking a period of time the particular ownership team has been on the blocking path; after commencement of execution of the job, at particular points in execution of the job: identifying states of tasks of the job, the states comprising one of: waiting for another task/finished, in progress, and, blocked; when all the tasks with identified states of in progress or blocked are assigned to a particular ownership team, identifying the particular ownership team as on the blocking path; increasing the period of time the particular ownership team has been on the blocking path; and when the period of time the particular ownership team has been on the blocking path exceeds a threshold amount, perform an action regarding the blocking path.

The method can include wherein the threshold amount is a maximum period of time to be on the blocking path. The method can further include wherein the threshold amount is less than the maximum period of time to be on the blocking path. The method can include wherein the threshold amount is based, at least in part, upon the identified particular ownership team.

The method can further include wherein the information regarding the job to be executed changes during execution of the job. The method can include wherein the method is performed periodically during execution of the job.

Described herein is a computer storage media storing computer-readable instructions that when executed cause a computing device to: receive information regarding a job to be executed, the job comprising a plurality of tasks, at least some of the tasks dependent on at least one other task, wherein each task is assigned to an ownership team of a plurality of ownership teams; at a particular point in execution of the job, identify states of tasks of the job, the states comprising one of: waiting for another task/finished, in progress, and, blocked; when all the tasks with identified states of in progress or blocked are assigned to a particular ownership team, identify the particular ownership team as on a blocking path; and perform an action regarding the blocking path.

The computer storage media can further include wherein the information regarding the job to be executed changes during execution of the job including dependency of at least one task. The computer storage media can further include wherein the computer-readable instructions are performed periodically during execution of the job.

The computer storage media can store further computer-readable instructions that when executed cause the computing device to: for at least one of the ownership teams, track a period of time the ownership team has been on the blocking path. The computer storage media can further store further computer-readable instructions that when executed cause the computing device to: for each ownership team, track a period of time the ownership team has been on the blocking path.

The computer storage media can further include wherein the action performed is based upon a hierarchical ordering of actions, the action selected based upon at least one of the particular identified ownership team, a particular identified as in progress or blocked, a length of time that the identified particular owning team has been on the block path, or, a length of time that the identified particular owning team has been on the blocking path over the execution of the job.

Figure 8:
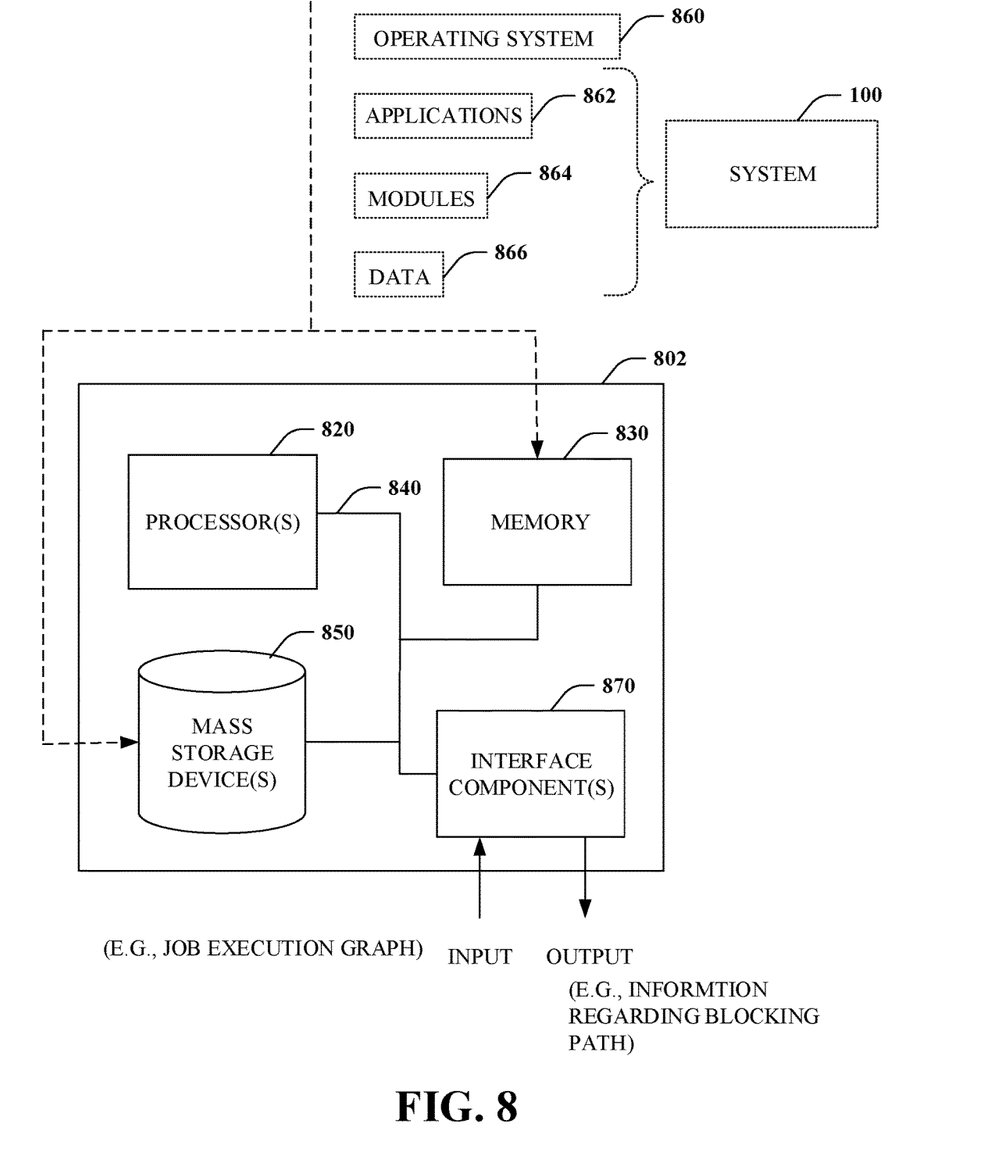
FIG. 8 is a functional block diagram that illustrates an exemplary computing system.

With reference to FIG. 8, illustrated is an example general-purpose computer or computing device 802 (e.g., mobile phone, desktop, laptop, tablet, watch, server, handheld, programmable consumer or industrial electronics, set-top box, game system, compute node, etc.). For instance, the computing device 802 may be used in a system for blocking path detection 100.

The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830. The instructions may be, for instance, instructions for implementing functionality described as being carried out by one or more components discussed above or instructions for implementing one or more of the methods described above.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory, etc.) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device (s) 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 862, and include one or more modules 864 and data 866 stored in memory and/or mass storage device(s) 850 whose functionality can be realized when executed by one or more processor(s) 820.

In some embodiments, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, FireWire, etc.) or an interface card (e.g., sound, video, etc.) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 870 can be embodied as an output peripheral interface to supply output to displays (e.g., LCD, LED, plasma, etc.), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory having computer-executable instructions stored thereupon which, when executed by the processor, cause the system to:
   receive information regarding a job to be executed on the system, the job comprising a plurality of tasks, at least some of the tasks having dependencies on at least one other task, wherein each task has one or more corresponding characteristics;
   at a particular point in execution of the job, identify execution states of respective tasks of the job, the execution states comprising one of: a waiting execution state, an in progress execution state, and a blocked execution state;
   when a set of tasks having the in progress execution state or the blocked execution share a particular characteristic in common, identify the set of tasks as on a blocking path of the job that prevents the system from executing other tasks of the job; and
   take at least one action with respect to the set of tasks on the blocking path.

2. The system of claim 1, wherein the job comprises a root job and multiple sub-jobs, and the memory stores further computer-executable instructions which, when executed by the processor, cause the system to:
   execute a scanning thread in the root job, the scanning thread running in parallel to an execution thread of the job and performing in-memory identification of the blocking path.

3. The system of claim 1, wherein the at least one action comprises creating an incident with respect to the blocking path or escalating severity of an existing incident with respect to the blocking path.

4. The system of claim 1, wherein the information regarding the job to be executed changes during execution of the job.

5. The system of claim 1, wherein the computer-executable instructions are performed periodically during execution of the job.

6. The system of claim 5, wherein the memory stores further computer-executable instructions which, when executed by the processor, cause the system to:

track a period of time that tasks having the particular characteristic in common have been on the blocking path of the job.

7. The system of claim 6, wherein the memory stores further computer-executable instructions which, when executed by the processor, cause the system to:
allocate resources to the job based at least on the length of time that the tasks having the particular characteristic in common have been on the blocking path of the job.

8. The system of claim 1, wherein the memory stores further computer-executable instructions which, when executed by the processor, cause the system to:
perform in-memory identification of the blocking path.

9. A method, comprising:
receiving information regarding execution of a job to be executed on a computing device, the job comprising a plurality of tasks, at least some of the tasks having respective dependencies on at least one other task, wherein each task has one or more corresponding characteristics;
after commencement of execution of the job, at particular points in execution of the job on the computing device:
identifying execution states of respective tasks of the job, the execution states being selected from a group comprising: a waiting execution state, an in-progress execution state, and a blocked execution state;
when a set of all tasks having the in-progress execution state or the blocked execution state share a particular characteristic in common, identifying the set of tasks as being on a blocking path of the job that prevents the computing device from executing other tasks of the job;
determining a period of time that the set of tasks sharing the particular characteristic have been on the blocking path and preventing the computing device from executing the other tasks of the job; and
when the period of time that the set of tasks sharing the particular characteristic have been on the blocking path exceeds a threshold amount, performing an action regarding the blocking path.

10. The method of claim 9, wherein the threshold amount is a maximum period of time to be on the blocking path.

11. The method of claim 9, wherein the threshold amount is less than the maximum period of time to be on the blocking path.

12. The method of claim 9, wherein the particular characteristic relates to one or more entities responsible for the tasks on the blocking path.

13. The method of claim 9, wherein the information regarding the job to be executed changes during execution of the job.

14. The method of claim 9, wherein the method is performed periodically during execution of the job.

15. A computer storage media storing computer-readable instructions that, when executed, cause a computing device to:
receive information regarding a job to be executed on the computing device, the job comprising a plurality of tasks, at least some of the tasks having dependencies on at least one other task, wherein each task has one or more corresponding characteristics;
at a particular point in execution of the job on the computing device, identify execution states of respective tasks of the job, the execution states comprising one of: a waiting execution state, an in progress execution state, and a blocked execution state;
when a set of each of the tasks having the in progress execution state or the blocked execution state shares a particular characteristic in common, identify the set of tasks as on a blocking path of the job that prevents the computing device from executing other tasks of the job; and
take at least one action with respect to the set of tasks on the blocking path.

16. The computer storage media of claim 15, wherein the information regarding the job to be executed changes during execution of the job including dependency of at least one task.

17. The computer storage media of claim 15, wherein the computer- readable instructions are performed periodically during execution of the job.

18. The computer storage media of claim 17 storing further computer-readable instructions that, when executed, cause the computing device to:
track a period of time that all tasks on the blocking path have had the particular characteristic.

19. The computer storage media of claim 17 storing further computer-readable instructions that, when executed, cause the computing device to:
for each respective characteristic of multiple characteristics, track a period of time that tasks having the respective characteristic have been on the blocking path.

20. The computer storage media of claim 17, the at least one action comprising outputting a notification regarding the blocking path via a user interface to a particular person that has the particular characteristic.

* * * * *